US010251052B2

(12) United States Patent
Lee et al.

(10) Patent No.: US 10,251,052 B2
(45) Date of Patent: Apr. 2, 2019

(54) METHOD OF DYNAMIC PDCP STATUS REPORT POLLING FOR LTE-WLAN AGGREGATION

(71) Applicant: MEDIATEK INC., Hsinchu (TW)

(72) Inventors: Chi-Chen Lee, Taipei (TW); Yu-Ting Yao, Tainan (TW); Ching-Yueh Kao, Taipei (TW)

(73) Assignee: MEDIATEK INC., HsinChu (TW)

( * ) Notice: Subject to any disclaimer, the term of this patent is extended or adjusted under 35 U.S.C. 154(b) by 162 days.

(21) Appl. No.: 15/247,176

(22) Filed: Aug. 25, 2016

(65) Prior Publication Data

US 2017/0064768 A1    Mar. 2, 2017

Related U.S. Application Data

(60) Provisional application No. 62/210,628, filed on Aug. 27, 2015.

(51) Int. Cl.
| | |
|---|---|
| H04W 4/00 | (2018.01) |
| H04W 8/22 | (2009.01) |
| H04L 12/26 | (2006.01) |
| H04L 12/24 | (2006.01) |
| H04W 88/06 | (2009.01) |

(52) U.S. Cl.
CPC ............. *H04W 8/22* (2013.01); *H04L 43/10* (2013.01); *H04L 41/0813* (2013.01); *H04W 88/06* (2013.01)

(58) Field of Classification Search
CPC ..... H04W 8/22; H04W 84/105; H04W 84/12; H04W 88/08; H04L 43/10; H04L 43/16
See application file for complete search history.

(56) References Cited

U.S. PATENT DOCUMENTS 7,889,686 B1    2/2011  Chang et al. .................. 370/310
8,305,901 B2 *  11/2012 Wu .......................... H04L 47/35
                                                             370/236.2
(Continued)

FOREIGN PATENT DOCUMENTS

| CN | 101766003 A | 6/2010 |
|---|---|---|
| CN | 102056226 A | 5/2011 |

(Continued)

OTHER PUBLICATIONS

International Search Report and Written Opinion of International Search Authority for PCT/CN2016/082204 dated (12 pages).

(Continued)

*Primary Examiner* — Stephen M D Agosta
(74) *Attorney, Agent, or Firm* — Imperium Patent Works; Zheng Jin

(57) ABSTRACT

To facilitate LWA PDCP setting/scheduling, a method of providing dynamic PDCP status report polling is proposed. To enhance scheduling efficiency, the transmitter (can be eNB from DL or UE for UL) can dynamically poll PDCP status report for LWA behavior. The polling can be done by a standalone PDCP control PDU or use reserved bit in PDCP data PDU. The triggering condition for PDCP status polling includes: PDCP without poll time exceeds a first threshold, PDCP without poll bytes exceeds a second threshold, PDCP without poll PDU numbers exceeds a third threshold, a data buffer is empty, and when LWA is deactivated.

11 Claims, 5 Drawing Sheets

(56) References Cited

U.S. PATENT DOCUMENTS

| | | | |
|---|---|---|---|
| 8,743,831 | B2 | 6/2014 | Wang et al. .................. 370/331 |
| 9,819,469 | B2* | 11/2017 | Horn ..................... H04L 5/0058 |
| 2008/0123655 | A1 | 5/2008 | Kim et al. ................... 370/394 |
| 2008/0198811 | A1 | 8/2008 | Deshpande et al. .......... 370/332 |
| 2009/0103445 | A1* | 4/2009 | Sammour ............ H04L 1/1812 370/252 |
| 2009/0104890 | A1* | 4/2009 | Wang .................... H04W 12/02 455/410 |
| 2009/0149189 | A1* | 6/2009 | Sammour ............... H04L 1/165 455/450 |
| 2009/0318152 | A1* | 12/2009 | Maheshwari ......... H04L 1/1822 455/436 |
| 2010/0003982 | A1* | 1/2010 | Somasundaram .... H04L 1/1877 455/436 |
| 2011/0205906 | A1 | 8/2011 | Yi et al. ....................... 370/241 |
| 2012/0224525 | A1* | 9/2012 | Wang .................... H04W 80/02 370/315 |
| 2013/0135987 | A1 | 5/2013 | Wang et al. ................. 370/216 |
| 2013/0272260 | A1* | 10/2013 | Bitran ................... H04W 16/14 370/329 |
| 2014/0050086 | A1 | 2/2014 | Himayat et al. ............. 370/230 |
| 2014/0169320 | A1 | 6/2014 | Yi et al. ....................... 370/329 |
| 2014/0321376 | A1* | 10/2014 | Damnjanovic ... H04W 72/1215 370/329 |
| 2015/0092573 | A1 | 4/2015 | Zhang et al. ................. 370/252 |
| 2015/0124743 | A1 | 5/2015 | Damnjanovic et al. ...... 370/329 |
| 2016/0014647 | A1 | 1/2016 | Yi et al. ....................... 370/331 |
| 2016/0050653 | A1 | 2/2016 | Rastogi ........................ 455/453 |
| 2016/0174107 | A1 | 6/2016 | Kanugovi et al. ........... 370/236 |
| 2016/0212661 | A1 | 7/2016 | Basu Mallick et al. ...... 370/331 |

FOREIGN PATENT DOCUMENTS

| | | |
|---|---|---|
| CN | 102984725 A | 3/2013 |
| CN | 103782622 A | 5/2014 |
| WO | WO2009045871 A2 | 4/2009 |
| WO | WO2013048049 A1 | 4/2013 |
| WO | WO2014163309 A1 | 10/2014 |
| WO | WO2015018653 A1 | 2/2015 |
| WO | WO2015064931 A1 | 5/2015 |
| WO | WO2015065855 A1 | 5/2015 |

OTHER PUBLICATIONS

3rd Generation Partnership Project; 3GPP System to Wireless Local Area Network (WLAN) Interworking; System Description 3GPP TS 23.234 V12.0.0 (Sep. 2014).
International Search Report and Written Opinion of International Search Authority for PCT/CN2016/096867 dated Dec. 22, 2016 (13 pages).
USPTO, office action for related U.S. Appl. No. 15/153,990 dated Nov. 28, 2017 (19 pages).
USPTO, office action for related U.S. Appl. No. 15/153,990 dated Apr. 19, 2018 (21 pages).
EPO search report for the EP patent application 16795862.8 dated Mar. 13, 2018 (14 pages).
3GPP TSG-RAN WG2 Meeting #89bis R2-151567, Huawei et al., "Procedure for the configuration of LTE-WLAN aggregation", Bratislava, Slovakia, Apr. 20-24, 2015 (4 pages).
3GPP TSG-RAN2 Meeting 89-bis R2-151719, Intel Corp. et al., "Agreements on LTE-WLAN Radio Level Integration and Interworking Enhancement", Bratislava, Slovakia, Apr. 20-24, 2015 (3 pages).
3GPP TS 36.331, V12.5.0 (Mar. 2015), 3rd Generation Partnership Project; Technical Specification Group Radio Access Network; Evolved Universal Terrestrial Radio Access (E-ULTRA); Radio Resource Control (RRC); Protocol specification (release 12), *chapters 5.3.3.4, 5.3.5.3, 5.3.5.4, 5.3.10.0, 5.3.10.3, 5.3.10.3b, 5.3.10.10, 5.3.10.11*, *pp. 181-184, 185-186, 193-194, 256-257, 273-277*.
3GPP TS 36.323 V12.5.0 (Mar. 2015), 3rd Generation Partnership Project; Technical Specification Group Radio Access Network; Evolved Universal Terrestrial Radio Access (E-UTRA); Packet Data Convergence Protocol (PPCP) specification (Release 12) *chapters 5.1.2.1.4.2, 5.3.1, 5.9, 6.1.2, 6.2.6, 6.3.2, 6.3.8, 6.3.9, 6.3.10, 7.2*.
3GPP TSG-RAN WG2 Meeting #89bis R2-151478, Alcatel-Lucent et al., "Architecture for LTE-WiFi aggregation", Bratislava, Slovakia, Apr. 20-24, 2015 (6 pages).
3GPP TSG-RAN2 #89bis R2-151357, MediaTek Inc., "Performance evaluation for R-12 IWK and LWA", Bratislava, Slovakia, Apr. 20-24, 2015 (4 pages).

* cited by examiner

METHOD OF DYNAMIC PDCP STATUS REPORT POLLING FOR LTE-WLAN AGGREGATION

CROSS REFERENCE TO RELATED APPLICATIONS

This application claims priority under 35 U.S.C. § 119 from U.S. Provisional Application No. 62/210,628 entitled "Method for Dynamic PDCP Status report polling" filed on Aug. 27, 2015, the subject matter of which is incorporated herein by reference.

TECHNICAL FIELD

The disclosed embodiments relate generally to wireless communication, and, more particularly, to dynamic PDCP status report polling for LTE-WLAN aggregation.

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Interworking between the LTE network and the unlicensed spectrum WLAN provides additional bandwidth to the operators.

The current approaches of interworking of LTE and WLAN suffer from various limitations that hamper the benefits of LTE-WLAN interworking. For example, core network approaches like Access Network Discovery and Selection Function (ANDSF) provide rich support for implementing operator policy, providing subscriber specific service, and enabling different kinds of WLAN deployment (e.g., trusted and non-trusted WLANs). However, the core network approaches suffer from significant performance shortcomings. These approaches are unable to react to dynamically varying radio conditions and do not permit aggregation of IP flows over LTE and WLAN access. Some of these limitations have been addressed 3GPP on RAN assisted 3GPP/WLAN interworking (IWK). While the RAN assisted IWK feature promises to improve Quality of Experience (QoE) and network utilization, it is also limited by the inability to aggregate IP flows as well as support of limited traffic granularity at the PDN level.

A potential solution to more fully reap the benefits of LTE-WLAN interworking is to allow LTE-WLAN aggregation (LWA) by integrating the protocol stacks of LTE and WLAN systems. The LTE-WLAN aggregation (LWA) provides data aggregation at the radio access network where an eNB schedules packets to be served on LTE and Wi-Fi radio link. The advantage of this solution is that LWA can provide better control and utilization of resources on both links. LWA can increase the aggregate throughput for all users and improve the total system capacity by better managing the radio resources among users. LWA borrows the concept of existing dual connectivity (DuCo) to let WLAN network being transport to Core Network (CN) for reducing CN load and support "packet level" offload. Under the architecture, the eNB can schedule the translation of PDU either by LTE or WLAN dynamically to improve UE perceived throughput (UPT). Thus, the scheduler is responsible to decide how many packets (or the traffic dispatching ratio) are translated to LTE/WLAN appropriately.

The CP/UP interface under DuCo does not exist under LWA and eNB fails to understand the backhaul delay information and WLAN's PDCP PDU delivery status when PDU is translating to WLAN link. If a WLAN terminal does not support feedback or flow control, then eNB may trigger status reporting from UE on air interface at PDCP layer using either PDCP status report or LWA status report. A solution of dynamic status report polling is sought to enhance LWA scheduling efficiency.

SUMMARY

LWA (LTE/WLAN Aggregation) is a tight integration at radio level which allows for real-time channel and load aware radio resource management across WLAN and LTE to provide significant capacity and quality of experience (QoE) improvements. When enabling LWA, packets are routed to a base station (eNB) for performing PDCP functionalities as an LTE PDU. Afterwards, the eNB can schedule the PDU either translated over LTE link or WLAN link. The eNB can acquire real-time PDCP and LWA status regarding the WLAN link or obtain PDCP layer performance feedback from the UE. As a result, the eNB can adjust PDCP parameter setting and LWA scheduling accordingly.

In accordance with a novel aspect, to facilitate LWA PDCP setting/scheduling, a method of providing dynamic PDCP status report polling is proposed. To enhance scheduling efficiency, the transmitter (can be eNB from DL or UE for UL) can dynamically poll PDCP status report for LWA behavior. The polling can be done by a standalone PDCP control PDU or use reserved bit in PDCP data PDU. The triggering condition for PDCP status polling includes: PDCP without poll time exceeds a first threshold, PDCP without poll bytes exceeds a second threshold, PDCP without poll PDU numbers exceeds a third threshold, a data buffer is empty, and when LWA is deactivated.

In one embodiment, a UE receives an RRC signaling message including an LWA configuration from a base station in a wireless network. The UE is connecting to an LWA-enabled AP as indicated in the LWA configuration. The UE also receives a polling configuration for PDCP status from the base station. The PDCP polling configuration and LWA configuration may or may not be received from same RRC signaling message. The UE exchanges with the base station a PDCP PDU containing a polling bit indicating PDCP status polling is triggered. Finally, the UE exchanges with the base station a PDCP status report based on the polling configuration.

In another embodiment, a base station transmits an RRC signaling message including an LWA configuration to a UE in a wireless network. The UE is connecting to an LWA-enabled AP as indicated in the LWA configuration. The base station also transmits a polling configuration for PDCP status to the UE. The PDCP polling configuration and LWA configuration may or may be transmitted within same RRC signaling message. The base station exchanges with the UE a PDCP PDU containing a polling bit indicating PDCP status polling is triggered. Finally, the base station exchanges with the UE a PDCP status report based on the polling configuration.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
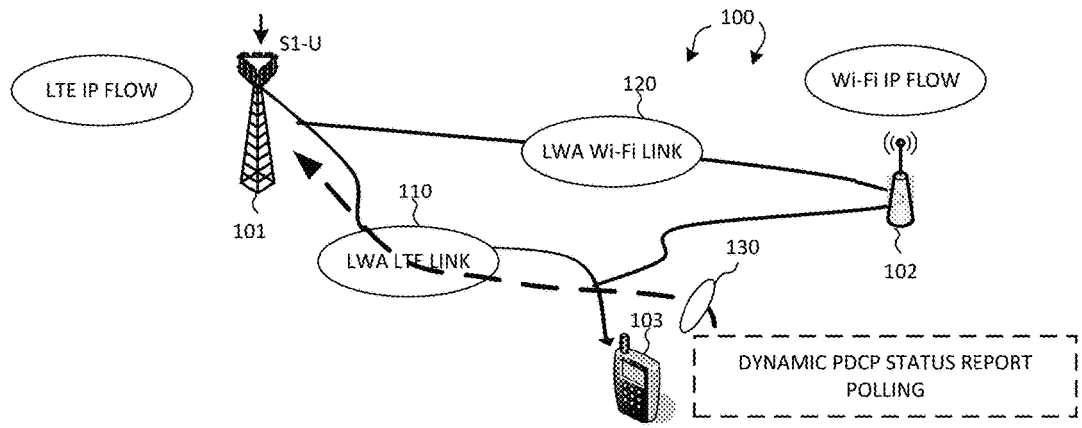
FIG. 1 illustrates a system diagram of a wireless network with LTE-WAN aggregation (LWA) in accordance with embodiments of the current invention.

FIG. 1 illustrates a system diagram of a wireless network 100 with LTE-WLAN aggregation (LWA) in accordance with embodiments of the current invention. Wireless network 100 comprises a base station eNB 101 that provides LTE cellular radio access via E-UTRAN, an access point AP 102 that provides Wi-Fi radio access via WLAN, and a user equipment UE 103. LTE-WLAN Aggregation (LWA) is a tight integration at radio level, which allows for real-time channel and load-aware radio resource management across LTE and WLAN to provide significant capacity and Quality of Experience (QoE) improvements. When enabling LWA, S1-U interface is terminated at eNB 101 whereby all IP packets are routed to eNB 101 and performed with PDCP layer operations as an LTE PDU. Afterwards, eNB 101 can schedule whether LWA-LTE link 110 or LWA-Wi-Fi link 120 the LTE PDU shall go. LWA borrows the concept of existing dual connectivity (DuCo) to let WLAN network being transport to the core network (CN) for reducing CN load and support "Packet level" offload.

In the example of FIG. 1, IP packets are carried between a serving gateway and eNB 101 over the S1-U interface. The LWA capable eNB 101 performs legacy PDCP layer operations such as ciphering and header compression (ROHC). In addition, the LWA capable eNB 101 is responsible for aggregating data flows over the LTE and WLAN air-interfaces. For example, the PDCP entity of the LWA capable eNB 101 performs traffic splitting, floor control, and new PDCP header handling for LWA packets received from the serving gateway. In the downlink, eNB 101 can schedule a few PDCP PDUs over LTE access and the remaining over WLAN access. The PDCP entity of the LWA capable UE 103 buffers the PDCP PDUs received over LTE and WLAN air interfaces and performs appropriate functions such as traffic converging and reordering, new PDCP header handling, and legacy PDCP operation. Similar functionality is also required for the uplink.

When eNB 101 schedules the packet to LTE link 110, based on configured SN length, corresponding PDCP header is added as a formal user data structure and then the PDCP PDU is sending to RLC entity. Alternatively, when the eNB 101 schedules the packet to WLAN link 120 to facilitate transmission over Wi-Fi radio, the PDCP entity will encapsulate the packet as an IEEE 802 frame format and consequently ferry the frame to WLAN AP 102 through user plane interface. Under the architecture, the eNB can schedule the translation of PDU either by LTE or WLAN dynamically to improve UE perceived throughput (UPT). Thus, the scheduling is responsible to decide how many packets (or the traffic dispatching ratio) are translated to LTE/WLAN appropriately. The eNB may perform such scheduling based on respective channel conditions or loadings, wherein the different scheduling algorithms may influence UPT a lot.

In accordance with a novel aspect, to facilitate LWA PDCP setting/scheduling, a method of providing dynamic PDCP status report polling is proposed as depict by 130. When LWA is running, UE 103 is requested to provide PDCP layer performance results and eNB 101 may adjust the scheduling/PDCP setting if needed. To enhance scheduling efficiency, the transmitter (can be eNB or UE) can dynamically poll PDCP status report for LWA behavior. The polling can be done by a standalone PDCP control PDU or use reserved bit in PDCP data PDU.

PDCP status report includes First Missing PDCP SN (FMS), bitmap of received PDCP SDUs. LWA status report includes First Missing PDCP SN (FMS), Number of Missing PDUs (NMP), and Highest Received SN on WLAN (HRW). Some form of PDCP status report conveying the status of the reordering window might be needed so that unexpected out-of-window drop could be avoided. For example, PDCP do not associate more than half of the PDCP SN space of contiguous PDCP SDUs with PDCP SNs. Furthermore, Wi-Fi do not have the same ARQ mechanism as in LTE with RLC AM. The status of delivery of DL data through Wi-Fi might not be known unless eNB-AP interface is available. Some form of report conveying the status of the receiving window might be needed as well. For example, the first missing PDCP SN<->the beginning of the reordering window.

Figure 2:
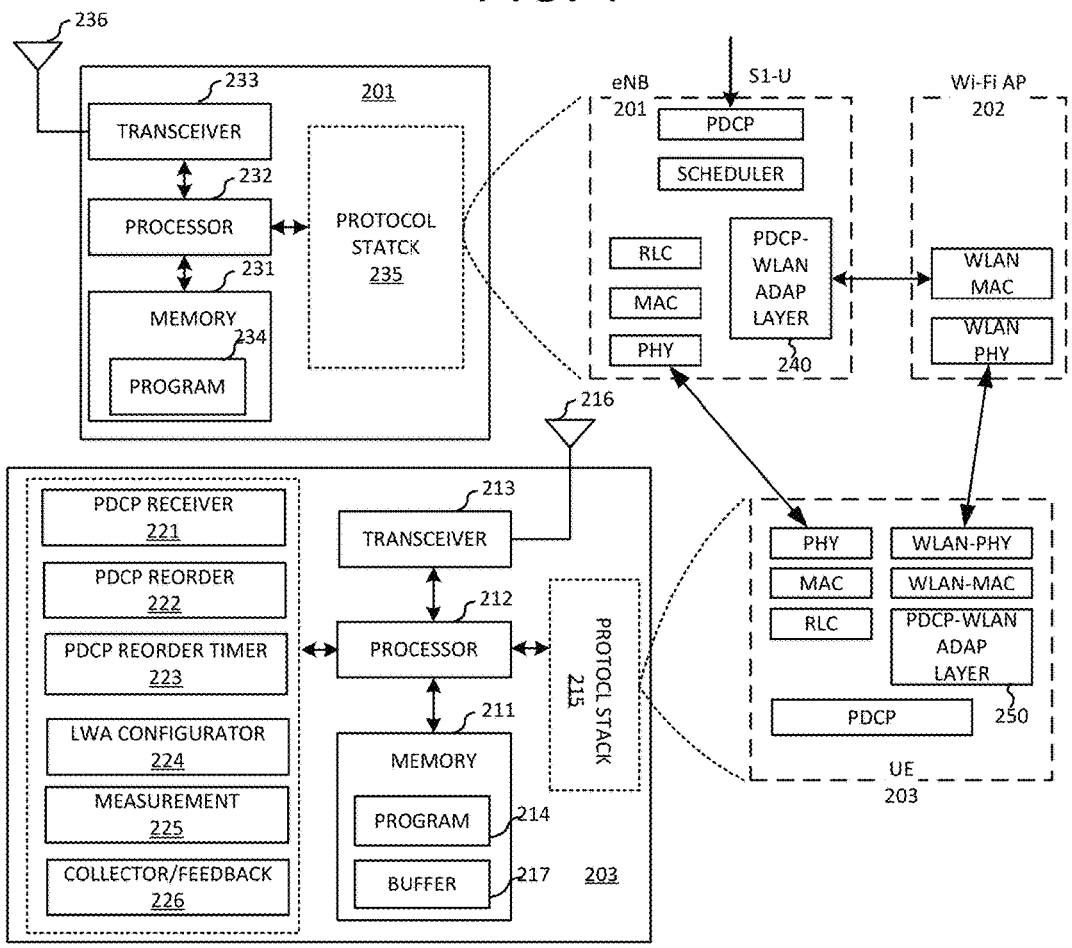
FIG. 2 illustrates simplified block diagram of LWA enabled network entities in accordance with embodiments of the current invention.

FIG. 2 illustrates simplified block diagrams for eNB 201, Wi-Fi AP 202, and UE 203. UE 203 has radio frequency (RF) transceiver module 213, coupled with antenna 216 receives RF signals from antenna 216, converts them to baseband signals and sends them to processor 212. RF transceiver 213 also converts received baseband signals from the processor 212, converts them to RF signals, and sends out to antenna 216. Processor 212 processes the received baseband signals and invokes different functional modules to perform features in UE 203. Memory 211 stores program instructions and data 214 and buffer 217 to control the operations of UE 203.

UE 203 also includes multiple function modules and circuits that carry out different tasks in accordance with embodiments of the current invention. UE 203 includes a PDCP receiver 221, a PDCP reordering handler 222, a PDCP reordering timer 223, an LWA configuration module 224, a measurement module 225, and a collector/feedback module 226. PDCP receiver 221 receives one or more PDCP protocol data units (PDUs) from lower layers. PDCP reordering module 222 performs a timer-based PDCP reordering process upon detecting a PDCP gap condition. PDCP reordering timer 223 starts a reordering timer when detecting the PDCP gap existing condition and detecting no reordering timer running. LWA configurator 224 configures LWA configuration received from the network for measurement and PDCP status report (periodically or polling). Measurement module 225 measures target PDUs. Collector/Feedback module 226 reports measurement results and collected PDCP status to the serving base station.

Similarly, FIG. 2 shows an exemplary block diagram for eNB 201. eNB 201 has RF transceiver module 233, coupled with antenna 236 receives RF signals from antenna 236, converts them to baseband signals and sends them to processor 232. RF transceiver 233 also converts received baseband signals from the processor 232, converts them to RF signals, and sends out to antenna 236. Processor 232 processes the received baseband signals and invokes different functional modules to perform features in eNB 201. Memory 233 stores program instructions and data 234 to control the operations of eNB 201. A protocol stack 235 performs enhanced protocol stack task in accordance to embodiments of the current invention.

FIG. 2 also shows that UE 203 is LWA-enabled and connects with an eNB 201 and a WLAN AP 202 with data aggregation at radio link level in accordance with embodiments of the current invention. UE 203 is connected with eNB 201. UE 203 also selects WLAN AP 202 for data aggregation. In protocol stack 235, eNB 201 has a PHY layer, a MAC layer, a RLC layer, a scheduler, and a PDCP layer. To enable the LWA, eNB 201 also has a PDCP-WLAN adapter 240 that aggregates the LTE data traffic through PHY with WLAN data traffic through WLAN AP 202. WLAN AP 202 has a WLAN PHY layer and a WLAN MAC layer. WLAN AP 202 connects with the WLAN network and can offload data traffic from the LTE network when UE 203 is connected with both the eNB 201 and the AP 202.

UE 203 is LWA-enabled. UE 203 has a PHY layer, a MAC layer, and a RLC layer that connect with the LTE eNB 201. UE 203 also has a WLAN PHY layer and a WLAN MAC layer that connect with WLAN AP 202. A WLAN-PDCP adaption layer 250 handles the split bearer from the LTE and the WLAN. UE 203 also has a PDCP layer entity. UE 203 aggregates its data traffic with eNB 201 and AP 202. WLAN PHY of WLAN AP 202 connects with WLAN PHY of UE 203 through a WLAN interface. PHY layer of LTE eNB 201 connects with PHY layer of UE 203 through a uu interface. For LWA, both the LTE data traffic and the WLAN data traffic are aggregated at the PDCP layer of UE 203. The PDCP-WLAN adaptation layer 240 at the eNB and the WLAN-PDCP adaptation layer 250 at the UE are proposed to facilitate transmission of LTE PDCP PDUs using WLAN frames in the downlink. Similar adaptation layers are proposed for uplink transmission of PDCP PDUs using WLAN frames.

Figure 3:
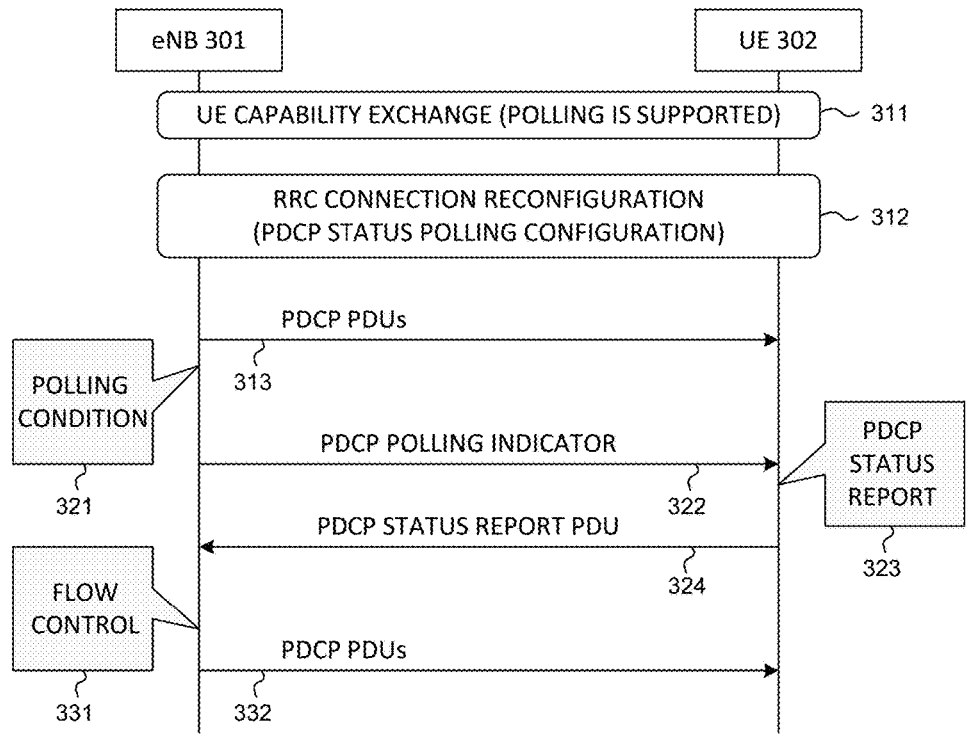
FIG. 3 illustrates one embodiment of dynamic PDCP status report polling for LWA in accordance with embodiments of the current invention.

FIG. 3 illustrates one embodiment of dynamic PDCP status report polling for LWA in accordance with embodiments of the current invention. In step 311, UE 302 indicates LWA support, including its MAC address to eNB 301. UE 302 also indicates whether PDCP status polling is supported. In step 312, eNB 301 activates LWA and configures mobility set, LWA bearer and security key involving another LWA-enabled AP such that UE 302 can perform WLAN association and authentication with the suitable AP. In this step, eNB 301 also provides PDCP status polling configuration if supported by UE 302. The PDCP status polling configuration includes polling report type (for DL LWA PDCP status) and the polling condition setting (for UL LWA PDCP status).

In step 313, PDCP data PDUs are sent on LTE and WLAN from eNB 301 to UE 302, which performs measurements and collect PDCP status and LWA status. In step 321, eNB 301 determines whether a polling condition is satisfied. For example, the PDCP status polling is triggered by at least one of a PDCP without poll time exceeds a first threshold ($T_{13}$ $PDCP_{13}$ without$_{13}$ poll), a PDCP without poll bytes exceeds a second threshold ($B_{13}$ $PDCP_{13}$ without$_{13}$ poll), a PDCP without poll PDU numbers exceeds a third threshold ($N_{13}$ $PDCP_{13}$ without$_{13}$ poll), a data buffer is empty, and when LWA is deactivated. If so, then in step 322, eNB 301 sends a PDCP polling indicator to UE 302 to poll PDCP status from UE 302. The polling indication can be done by a standalone PDCP control PDU or use reserved bit in PDCP data PDU. In step 323, UE 302 prepares PDCP status report based on the PDCP and LWA status configuration. In step 324, UE 302 sends PDCP and LWA status report PDU to eNB 301. In step 331, eNB 301 performs updated flow control based on the received PDCP status report. In step 332, PDCP data PDUs are sent on LTE and WLAN from eNB 301 to UE 302 based on updated scheduling.

Figure 4:
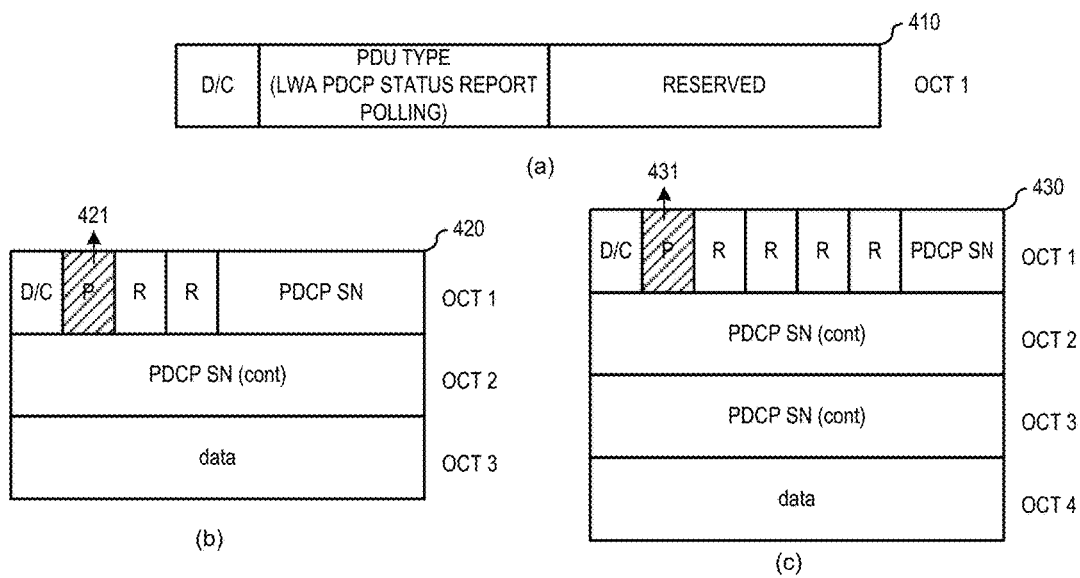
FIG. 4 illustrates examples of using standalone PDCP control PDU and PDCP data PDU for dynamic PDCP status report polling for LWA.

FIG. 4 illustrates examples of using standalone PDCP control PDU and PDCP data PDU for dynamic PDCP status report polling for LWA. In the example of FIG. 4(a), a standalone PDCP control PDU 410 is used for PDCP status polling. The PDU type in PDU 410 can be set to a specific value to indicate PDCP status polling. In the example of FIG. 4(b), a reserved bit 421 in a PDCP data PDU 420 is used to indicate PDCP status polling. PDCP data PDU 420 has a format for DRBs using 12-bit sequence number. In the example of FIG. 4(c), a reserved bit 431 in a PDCP data PDU 430 is used to indicate PDCP status polling. PDCP data PDU 430 has a format for DRBs using 18-bit sequence number. If the reserved bit is set to 1, then it indicates PDCP status polling is triggered. On the other hand, if the reserved bit is set to 0, then it indicates PDCP status polling is not triggered.

Figures 5, 6:
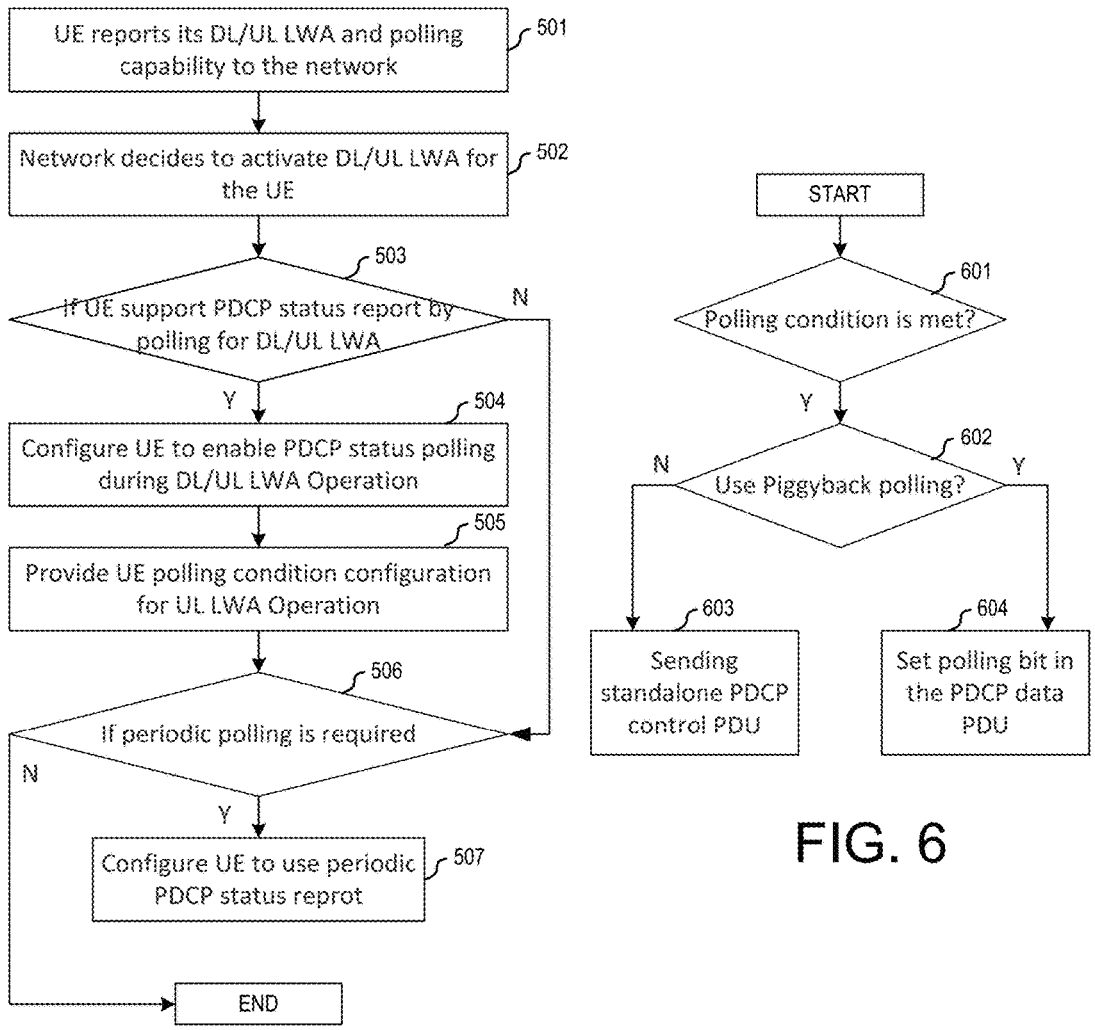
FIG. 5 illustrates a flow chart of configuring PDCP status report for downlink and uplink LWA.
FIG. 6 illustrates a flow chart of providing PDCP status report for downlink and uplink LWA.

FIG. 5 illustrates a flow chart of configuring PDCP status report for downlink and uplink LWA. In step 501, a UE reports its downlink and uplink (DL/UL) LWA capability and polling capability to the network. In step 502, the network decides to activate DL/UL LWA for the UE. In step 503, the network determines whether the UE supports PDCP status report by polling for DL/UL LWA. If the answer is no, then in step 506, the network determines whether periodic PDCP status report is required. If the answer is yes, then the network configures the UE to use periodic PDCP status report. If the answer to step 503 is yes, then in step 504, the network configures the UE to enabled PDCP status polling during DL/UL LWA operation. In step 505 the network provides the UE polling condition configuration for UL LWA operation and goes to step 506.

For DL LWA, the transmitting device is the network (e.g., base station) and the receiving device is the UE. The network determines the polling condition configuration for DL LWA operation and triggers PDCP status polling upon any of the configured polling conditions is satisfied. The UE then sends PDCP status report back to the base station. On the other hand, for UL LWA, the transmitting device is the UE, and the receiving device is the network (e.g., base station). The network determines the PDCP polling condition configuration for UL LWA operation and then provides the configuration to the UE. The UE then triggers PDCP status polling upon any of the configured polling conditions is satisfied. The base station then sends PDCP status report back to the UE.

FIG. 6 illustrates a flow chart of providing PDCP status report for downlink and uplink LWA. If DL LWA operation and PDCP status polling for DL LWA is properly configured, then in step 601, the network determines whether polling condition is met. On the other hand, if UL LWA operation and PDCP status polling for UL LWA is properly configured, then in step 601, the UE determines whether polling condition is met. Once the polling condition is met, then in step 602, the network/UE determines whether piggyback polling is applied. If the answer is no, then in step 603, the network/UE sends a standalone PDCP control PDU to indicate the triggering of PDCP status polling. On the other hand, if the answer to step 602 is yes, the in step 604, the network/UE sets a polling bit in a PDCP data PDU to indicate the triggering of PDCP status polling.

Figure 7:
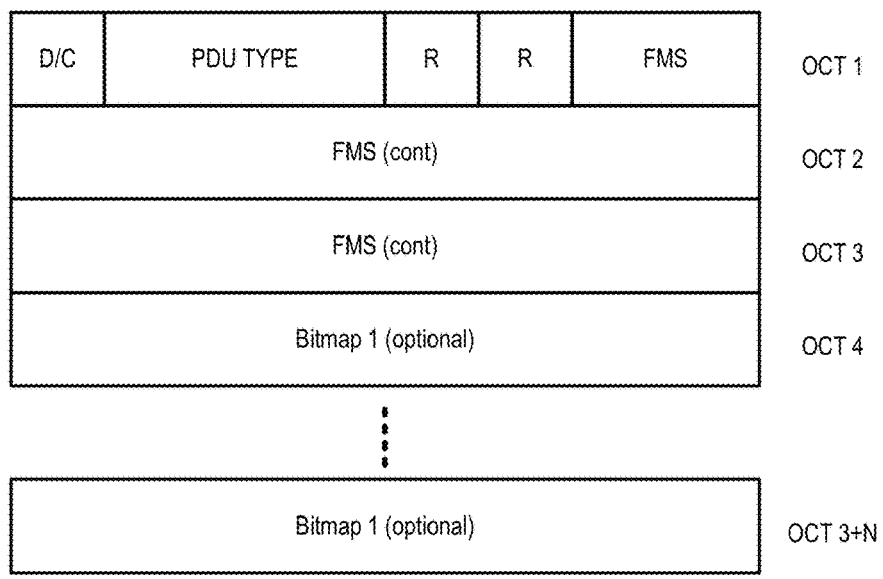
FIG. 7 illustrate a first example of PDCP status report format for LWA.

FIG. 7 illustrate a first example of PDCP status report format using an 18-bit SN for LWA. PDCP status report includes First Missing PDCP SN (FMS), bitmap of received PDCP SDUs. In the example of FIG. 7, the FMS field is set to the PDCP SN of the first missing PDCP SDU. If there is at least one out-of-sequence PSCP SDU stored, allocating a Bitmap field of length in bits equal to the number of PDCP SNs from and not including the first missing PDCP SDU up to and including the last out-of-sequence PDCP SDUs, rounded up to the next multiple of 8m or up to and including a PDCP SDU for which the resulting PDCP Control PDU size is equal to 8188 bytes, whichever comes first. For all PDCP SDUs that have not been received as indicated by lower layer, setting as '0' in the corresponding position in the bitmap field, and optionally PDCP SDUs for which decompression have failed. For all other PDCP SDUs, indicating in the bitmap field as '1'.

Figure 8:
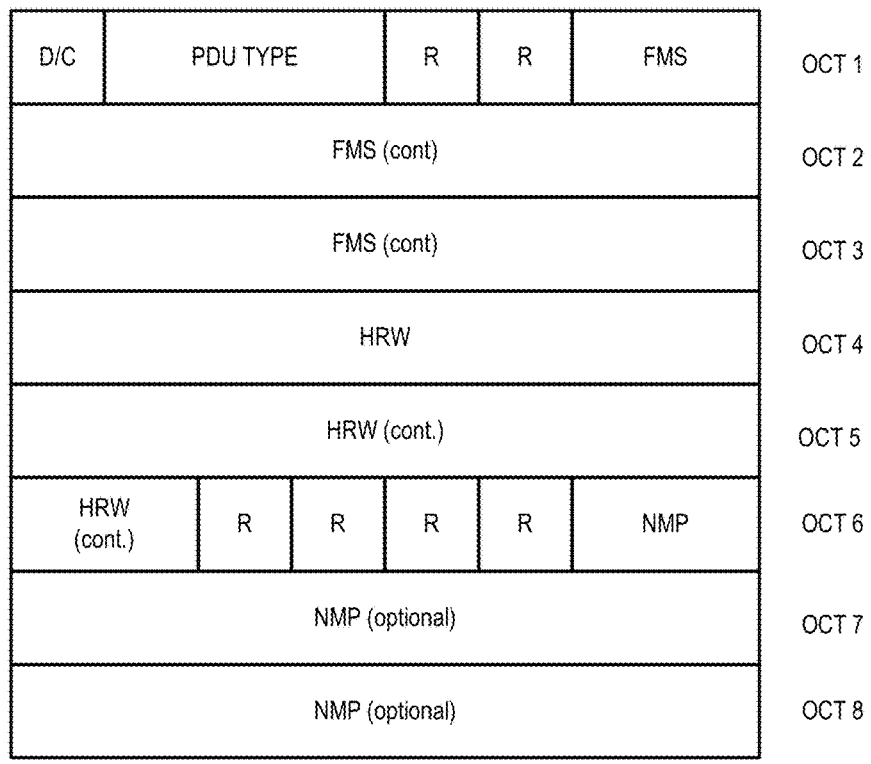
FIG. 8 illustrates a second example of PDCP status report format for LWA.

FIG. 8 illustrates a second example of LWA status report format using an 18-bit SN for LWA. LWA status report includes First Missing SN (FMS), Number of Missing PDUs (NMP), and Highest Received SN on WLAN (HRW). In the example of FIG. 8, the FMS field is set to the PDCP SN of the first missing PDCP SDU. If no PDCP SDUs have been received on WLAN, setting the HRW field to the PDCP SN of the PDCP SDU received on WLAN with highest PDCP COUNT value or to FMS. The NMP field is set to the number of missing PDCP SNs.

Before LWA was introduced, there is no PDCP status report polling mechanism. PDCP status report polling mechanism can provide real-time status feedback for LWA flow control. LWA flow control is used to decide the traffic dispatching in order to optimize user throughput. More specifically, if the transmitter can let the receiver know whether the lost PDCP PDU will be retransmitted, the receiver can have smaller buffer size and shorter packet latency. Therefore, a new parameter for PDCP configuration can be introduced. If a PDCP re-transmission parameter is configured, then the receiver cannot deliver the discontinuous PDUs until the successful retransmission or reordering timer expires.

Figure 9:
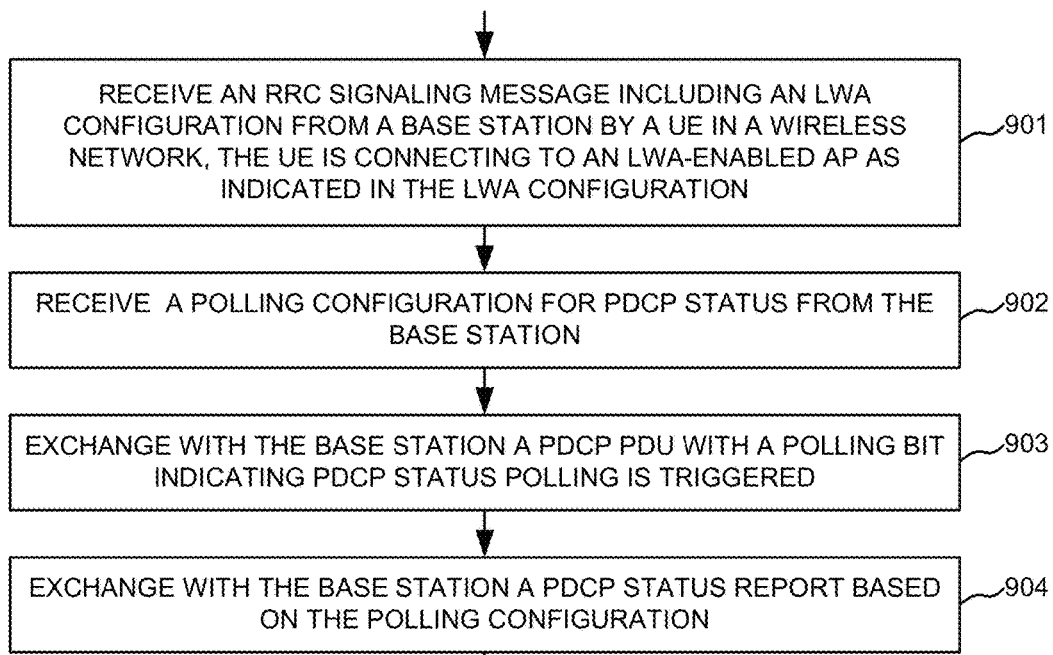
FIG. 9 is a flow chart of a method of dynamic PDCP status report polling for LWA from UE perspective in accordance with one novel aspect.

FIG. 9 is a flow chart of a method of dynamic PDCP status report polling for LWA from UE perspective in accordance with one novel aspect. In step 901, a UE receives an RRC signaling message including an LWA configuration from a base station in a wireless network. The UE is connecting to an LWA-enabled AP as indicated in the LWA configuration. In step 902, the UE receives a polling configuration for PDCP status from the base station. In step 903, the UE exchanges with the base station a PDCP PDU containing a polling bit indicating PDCP status polling is triggered. In step 904, the UE exchanges with the base station a PDCP status report based on the polling configuration. Note that the LWA configuration and PDCP polling configuration may or may not be included in the same RRC signaling message.

Figure 10:
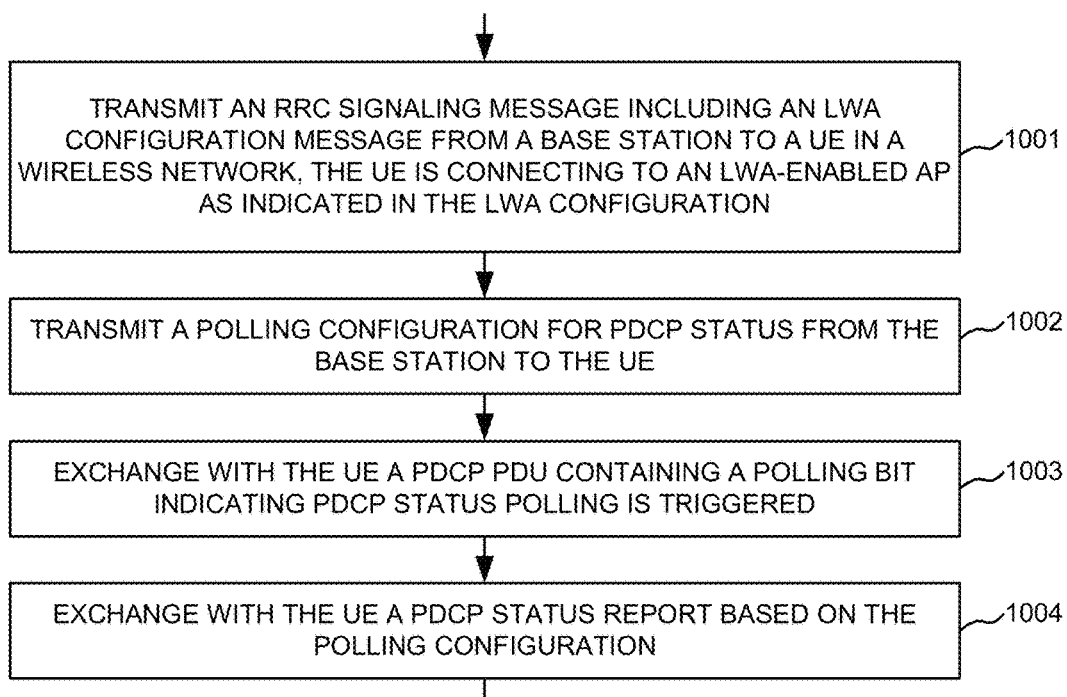
FIG. 10 is a flow chart of a method of dynamic PDCP status report polling for LWA from eNB perspective in accordance with one novel aspect.

FIG. 10 is a flow chart of a method of dynamic PDCP status report polling for LWA from eNB perspective in accordance with one novel aspect. In step 1001, a base station transmits an LWA configuration message to a UE in a wireless network. The UE is connecting to an LWA-enabled AP as indicated in an RRC signaling message including the configuration. In step 1002, the base station transmits an a polling configuration for PDCP status to the UE. In step 1003, the base station exchanges with the UE a PDCP PDU containing a polling bit indicating PDCP status polling is triggered. In step 1004, the base station exchanges with the UE a PDCP status report based on the polling configuration. Note that the LWA configuration and PDCP polling configuration may or may not be included in the same RRC signaling message.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a radio resource control (RRC) signaling message including an LTE-WLAN aggregation (LWA) configuration from a base station by a user equipment (UE) in a wireless network, wherein the UE is connecting to an LWA-enabled access point (AP) as indicated in the LWA configuration;
   receiving a polling configuration for packet data convergence protocol (PDCP) status from the base station;
   exchanging with the base station a PDCP protocol data unit (PDU) containing a polling bit indicating PDCP status polling is triggered, wherein the UE receives the polling bit for downlink LWA, wherein the PDCP PDU is a PDCP data PDU piggybacked with the polling bit, and wherein the polling bit is one of the reserved bits of an LTE 18-bit PDCP data PDU of first Octet, or one of the reserved bits of an LTE 12-bit PDCP data PDU of first Octet; and
   exchanging with the base station a PDCP status report based on the polling configuration, wherein the PDCP status report comprises at least an HRW (Highest Received SN on WLAN).

2. The method of claim 1, wherein the polling configuration for PDCP status and the LWA configuration are received from the same RRC signaling message.

3. The method of claim 1, wherein the PDCP status polling is triggered by at least one of a PDCP without poll time exceeds a first threshold, a PDCP without poll bytes exceeds a second threshold, a PDCP without poll PDU numbers exceeds a third threshold, a data buffer is empty, and when LWA is deactivated.

4. The method of claim 1, wherein the PDCP status report further comprises at least one of serial number (SN) of lost PDCP PDU, FMS (first missing PDCP SN) information, number of packets received from LTE and from WLAN separately, and NMP (number of Missing PDUs).

5. A user equipment (UE) comprising:
a radio frequency (RF) receiver that receives a radio resource control (RRC) signaling message including an LTE-WLAN aggregation (LWA) configuration in a wireless network, wherein the UE is connecting to an LWA-enabled access point (AP) as indicated in the LWA configuration, wherein the RF receiver also receives a polling configuration for packet data convergence protocol (PDCP) status from the base station; and
an RF transceiver that exchanges with the base station a PDCP protocol data unit (PDU) containing a polling bit indicating PDCP status polling is triggered, wherein the PDCP PDU is a PDCP data PDU piggybacked with the polling bit, wherein the polling bit is one of the reserved bits of an LTE 18-bit PDCP data PDU of first Octet, or one of the reserved bits of an LTE 12-bit PDCP data PDU of first Octet, wherein the RF transceiver also exchanges with the base station a PDCP status report based on the polling configuration, wherein the UE receives the polling bit for downlink LWA, and wherein the PDCP status report comprises at least an HRW (Highest Received SN on WLAN).

6. The UE of claim 5, wherein the polling configuration for PDCP status and the LWA configuration are received from same RRC signaling message.

7. The UE of claim 5, wherein the PDCP status polling is triggered by at least one of a PDCP without poll time exceeds a first threshold, a PDCP without poll bytes exceeds a second threshold, a PDCP without poll PDU numbers exceeds a third threshold, a data buffer is empty, and when LWA is deactivated.

8. The UE of claim 5, wherein the PDCP status report comprises at least one of serial number (SN) of lost PDCP PDU, number of packets received from LTE and from WLAN separately, NMP (number of Missing PDUs).

9. A method, comprising:
transmitting a radio resource control (RRC) signaling message including an LTE-WLAN aggregation (LWA) configuration from a base station to a user equipment (UE) in a wireless network, wherein the UE is connecting to an LWA-enabled access point (AP) as indicated in the LWA configuration;
transmitting a polling configuration for packet data convergence protocol (PDCP) status from the base station;
exchanging with the UE a PDCP protocol data unit (PDU) containing a polling bit indicating PDCP status polling is triggered, wherein the base station transmits the polling bit for downlink LWA, wherein the PDCP PDU is a PDCP data PDU piggybacked with the polling bit, and wherein the polling bit is one of the reserved bits of an LTE 18-bit PDCP data PDU of first Octet, or one of the reserved bits of an LTE 12-bit PDCP data PDU of first Octet; and
exchanging with the UE a PDCP status report based on the polling configuration, wherein the PDCP status report comprises at least an HRW (Highest Received SN on WLAN).

10. The method of claim 9, wherein the PDCP status polling is triggered by at least one of a PDCP without poll time exceeds a first threshold, a PDCP without poll bytes exceeds a second threshold, a PDCP without poll PDU numbers exceeds a third threshold, a data buffer is empty, and when LWA is deactivated.

11. The method of claim 9, wherein the PDCP status report comprises at least one of serial number (SN) of lost PDCP PDU, number of packets received from LTE and from WLAN separately, NMP (number of Missing PDUs).

* * * * *